(12) United States Patent
Izui et al.

(10) Patent No.: US 12,458,600 B2
(45) Date of Patent: Nov. 4, 2025

(54) METHOD FOR PRODUCING GRANULES CONTAINING A CORE PARTICLE, GRANULES CONTAINING A CORE PARTICLE, PHARMACEUTICAL COMPOSITION CONTAINING THE GRANULES CONTAINING THE CORE PARTICLE, AND PREPARATION CONTAINING THE PHARMACEUTICAL COMPOSITION

(71) Applicant: SAWAI PHARMACEUTICAL Co., Ltd., Osaka (JP)

(72) Inventors: Wataru Izui, Osaka (JP); Kenji Nozawa, Osaka (JP); Hiroyuki Yamamoto, Osaka (JP); Ryota Kimata, Osaka (JP); Naoki Yoshihara, Osaka (JP)

(73) Assignee: SAWAI PHARMACEUTICAL Co., Ltd., Osaka (JP)

( * ) Notice: Subject to any disclaimer, the term of this patent is extended or adjusted under 35 U.S.C. 154(b) by 272 days.

(21) Appl. No.: 17/169,807

(22) Filed: Feb. 8, 2021

(65) Prior Publication Data

US 2021/0251904 A1    Aug. 19, 2021

(30) Foreign Application Priority Data

Feb. 18, 2020    (JP) .................................. 2020-025556

(51) Int. Cl.
*A61K 9/16*    (2006.01)
*A61K 31/13*    (2006.01)
(Continued)

(52) U.S. Cl.
CPC .......... *A61K 9/1694* (2013.01); *A61K 9/1623* (2013.01); *A61K 9/1635* (2013.01);
(Continued)

(58) Field of Classification Search
None
See application file for complete search history.

(56) References Cited

U.S. PATENT DOCUMENTS 4,302,440 A * 11/1981 John ..................... A61K 9/2866
424/480
5,505,983 A * 4/1996 Kamada ............... A61K 9/5078
427/2.21
(Continued)

FOREIGN PATENT DOCUMENTS

JP    H5-92918 A    4/1993
JP    H5-339158 A    12/1993
(Continued)

OTHER PUBLICATIONS

UnitChefs. 0.011 Inches to Microns. 2 pages. (Year: 2023).*
(Continued)

*Primary Examiner* — Lakshmi S Channavajjala
(74) *Attorney, Agent, or Firm* — HAUPTMAN HAM, LLP

(57) ABSTRACT

A method for producing granules containing a core particle by using a general granulation method is provided. Granules containing a core particle produced by the method are provided. In addition, a pharmaceutical composition and preparation containing the granules containing the core particle are provided. The granulation method according to an embodiment of the present invention granulates by spraying granulation liquid having a mist diameter ($D_{50}$) not more than the particle size ($D_{50}$) of the core particle on a mixture containing a drug substance and a core particle. The granulation liquid may be water. The particle size of the core particle ($D_{50}$) may be larger than the particle size ($D_{50}$) of the drug substance.

15 Claims, 11 Drawing Sheets

(51) Int. Cl.
  *A61K 31/137* (2006.01)
  *A61K 31/343* (2006.01)
(52) U.S. Cl.
  CPC ............ *A61K 9/1652* (2013.01); *A61K 9/167* (2013.01); *A61K 31/13* (2013.01); *A61K 31/137* (2013.01); *A61K 31/343* (2013.01)

(56) References Cited

U.S. PATENT DOCUMENTS

| | | | | |
|---|---|---|---|---|
| 6,136,772 | A * | 10/2000 | De Lima ............ | C11D 17/0039 510/438 |
| 8,741,350 | B2 * | 6/2014 | Folger .................... | A61K 31/55 424/490 |
| 2007/0264346 | A1 * | 11/2007 | Guimberteau ....... | A61K 9/4808 424/484 |
| 2008/0254112 | A1 * | 10/2008 | Klokkers .................. | A61P 9/12 424/451 |
| 2010/0303951 | A1 * | 12/2010 | Sunvold ............... | A23K 20/174 426/2 |
| 2011/0129530 | A1 * | 6/2011 | Venkatesh ............ | A61K 31/167 514/648 |

FOREIGN PATENT DOCUMENTS

| | | | | |
|---|---|---|---|---|
| JP | H0764726 | B2 * | 7/1995 | ............... A61K 9/42 |
| JP | H9-267035 | A | 10/1997 | |
| JP | 2006-188473 | A | 7/2006 | |
| JP | 2010-111592 | A | 5/2010 | |
| JP | 2012-25683 | A | 2/2012 | |
| JP | 2013-241451 | A | 12/2013 | |
| JP | 2015-218322 | A | 12/2015 | |
| JP | 2018-127446 | A | 8/2018 | |

OTHER PUBLICATIONS

Wong et al. Investigation on Side-Spray Fluidized Bed Granulation with Swirling Airflow. AAPS PharmSciTech, vol. 14.No. 1, Mar. 2013. (Year: 2013).*
Pharmaceutical Technology, Moisture-Activated Dry Granulation—Part I: A Guide to Excipient and Equipment Selection and Formulation Development Pharmaceutical Technology—Nov. 2, 2009, vol. 33: 11, Nov. 2, 2009 (Year: 2009).*
Office Action issued on Dec. 19, 2023 for corresponding Japanese Patent Application No. 2020-025556, along with an English machine translation (10 pages).
Office Action dated Jul. 29, 2025 for corresponding Japanese Patent Application No. 2024-073691, along with an English machine translation (8 pages).

* cited by examiner

METHOD FOR PRODUCING GRANULES CONTAINING A CORE PARTICLE, GRANULES CONTAINING A CORE PARTICLE, PHARMACEUTICAL COMPOSITION CONTAINING THE GRANULES CONTAINING THE CORE PARTICLE, AND PREPARATION CONTAINING THE PHARMACEUTICAL COMPOSITION

CROSS-REFERENCE TO RELATED APPLICATIONS

This application is based upon and claims the benefit of priority from the prior Japanese Patent Application No. 2020-025556, filed on Feb. 18, 2020, the entire contents of which are incorporated herein by reference.

FIELD

The present invention relates to a method for producing granules containing core particle, granules containing a core particle, pharmaceutical composition containing the granules containing the core particle and preparation containing the pharmaceutical composition.

BACKGROUND

Preparing drug-containing granules is one of key steps in formulation and can improve the fluidity of the drug substance and uniformity in a preparation. As a method of preparing the drug-containing granules, for example, a method of spraying granulation liquid on a mixture of a drug substance and an excipient to granulate is known. Also, as the method of preparing the drug-containing granules, layering of the drug substance using a core particle is known. Layering is a method of forming a layering granule having a drug substance layer on a surface of a core particle by spraying a solution in which the drug substance is dissolved or dispersed in a solvent on the core particle.

For example, Japanese laid-open patent publication No. 2015-218322 discloses a layering granule in which partly pregelatinized starch or pregelatinized starch having an average particle size ($D_{50}$) of 5 to 50 μm is coated with a drug layer.

However, in the conventional manufacturing method described in Japanese laid-open patent publication No. 2015-218322, since the solution in which a drug is dissolved or dispersed in the solvent is sprayed onto particles serving as the core, there has been a problem that a manufacturing time is long.

SUMMARY

An embodiment of the present invention provides a method for producing granules containing a core particle which can be produced more conveniently than a conventional production method. An embodiment of the present invention provides granules containing the core particle produced by the method. An embodiment of the present invention provides a pharmaceutical composition and a preparation including the granules containing the core particle.

According to an embodiment of the present disclosure, provided is a method for producing granules containing a core particle including spraying granulation liquid having a mist diameter ($D_{50}$) not more than a particle size ($D_{50}$) of the core particle on a mixture containing a drug substance and the core particle to granulate the mixture.

The granulation liquid may be water.

The core particle may be one selected from a group consisting of a partly pregelatinized starch, a thickening polysaccharide and a carboxyvinyl polymer.

The particle size of the core particle may be larger than a particle size of the drug substance.

It may be granulated by a stirring granulation method or a rotating fluidized bed granulation method.

According to an embodiment of the present invention, provided are granules containing a core particle and a drug substance arranged on a surface of the core particle.

An additive agent may be further included in a layer containing the drug substance.

The core particle may be one selected from a group consisting of a partly pregelatinized starch, a thickening polysaccharide and a carboxyvinyl polymer.

A particle size ($D_{50}$) of the core particle may be larger than a particle size ($D_{50}$) of the drug substance.

According to an embodiment of the present disclosure, provided is granules containing a core particle and a drug substance arranged on a surface of the core particle, and the core particle is granulated by spraying granulation liquid having a mist diameter ($D_{50}$) not more than the particle size ($D_{50}$) of the core particle to a mixture containing the drug substance and the core particle.

The granulation liquid may be water.

The core particle may be one selected from a group consisting of a partly pregelatinized starch, a thickening polysaccharide and a carboxyvinyl polymer.

A particle size ($D_{50}$) of the core particle may be larger than a particle size ($D_{50}$) of the drug substance.

According to an embodiment of the present invention, provided is a pharmaceutical composition including the granules containing any one of the core particles and one or more pharmaceutically acceptable additive agents.

According to an embodiment of the present invention, provided is a preparation including the pharmaceutical composition.

DESCRIPTION OF EMBODIMENTS

Figure 1:
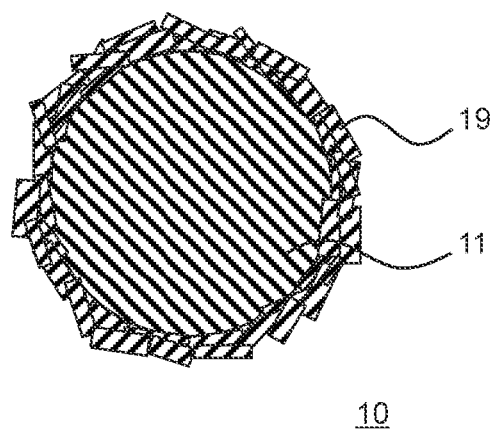
FIG. 1 is a schematic diagram showing a granule containing a core particle according to an embodiment of the present invention.

Hereinafter, a method for producing granules containing the core particle and the granules containing the core particle according to the present invention will be described referring to drawings. The method for producing the granules containing the core particle and the granules containing the core particle of the present invention are not to be construed as being limited to the description contents of the embodiments and examples shown below. In the drawings referred to in the present embodiment and the examples to be described later, the same portions or portions having similar functions are denoted by the same reference numerals, and a repetitive description thereof is omitted.

Embodiment 1

FIG. 1 is a schematic diagram showing a granule containing a core particle according to an embodiment of the present invention and is a schematic view showing a cross section of a granule 10 containing a core particle in which a plurality of drug substances 19 is arranged on a surface of one core particle 11. The granule 10 containing the core particle has a structure in which the plurality of the drug substances 19 is adhered to the surface of the core particle 11. As the core particle 11, a partly pregelatinized starch, a thickening polysaccharide such as xanthan gum or guar gum, or a carboxyvinyl polymer can be exemplified, but the core particle 11 is not limited thereto.

A particle size ($D_{50}$) of the core particle 11 is preferably larger than a particle size ($D_{50}$) of the drug substance 19. In an embodiment, the core particle 11 preferably has a particle size ($D_{50}$) that is 60 μm or more and 250 μm or less. A shape of the core particle 11 is not particularly limited to a spherical shape, but in an embodiment, when the core particle 11 is used for an intraorally disintegrating tablet, a substantially spherical shape is preferable because the amount of coating of the granule 10 containing the core particle in a coating process such as bitter taste-masking can be reduced.

Although there is no particular limitation on the drug substance 19 contained in the granule 10 containing the core particle 11, a drug substance of a needle crystal or a plate crystal can be used which has been conventionally difficult to obtain a spherical granule. In order to arrange the drug substance 19 on the surface of the core particle 11, in an embodiment, the drug substance 19 preferably has a particle size having $D_{50}<50$ μm, and more preferably has a particle size having $D_{50}<30$ μm. In the granule 10 containing the core particle according to the present invention, the solubility of the drug substance to the granulation liquid is not particularly limited, and may be any of easily soluble, soluble, and hardly soluble to the granulation liquid. In an embodiment, escitalopram oxalate, cinacalcet hydrochloride, memantine hydrochloride, and ramelteon are used for the drug substance 19, but the drug substance 19 is not limited thereto.

[Method for Producing Granules Containing a Core Particle]

According to an embodiment, the granule 10 containing the core particle can be produced by spraying granulation liquid having a mist diameter ($D_{50}$) not more than a particle size ($D_{50}$) of the core particle 11 to a mixture containing the drug substance 19 and the core particle 11. In an embodiment, a mist diameter ($D_{50}$) of the granulation liquid is preferably smaller than the particle size ($D_{50}$) of the core particle 11, and is preferably 90% or less, 80% or less, 70% or less, or 60% or less of the particle size ($D_{50}$) of the core particle 11. For example, the mist diameter ($D_{50}$) of the granulation liquid may be 100 μm or less. In this specification, "mist" is spray mist and is a microdroplet of granulation liquid generated by injecting the granulation liquid.

In an embodiment, when the partly pregelatinized starch, the thickening polysaccharide, or the carboxyvinyl polymer is used as the core particle 11, water (purified water) can be used for the granulation liquid. Granulation liquid other than water may be used as long as it is liquid having an affinity for the particle used as the core.

In an embodiment, a granulation process can be carried out using a stirring granulation method or a rotating fluidized bed granulation method.

According to the granulation method according to the present embodiment, it is possible to provide granules containing a spherical or substantially spherical shaped core particle more conveniently than the conventional production method.

Embodiment 2

Figure 2:
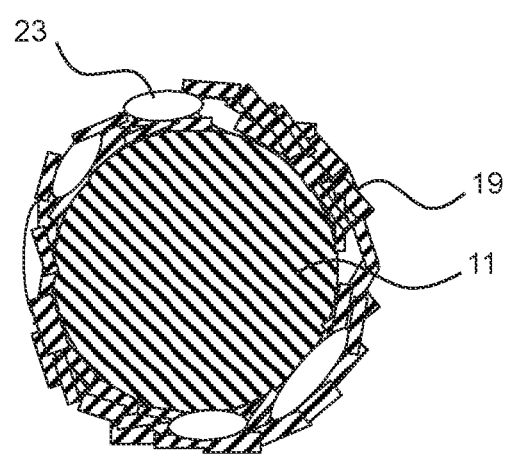
FIG. 2 is a schematic diagram showing a granule containing a core particle according to an embodiment of the present invention.

FIG. 2 is a schematic diagram showing a granule 20 containing the core particle according to an embodiment of the present invention. The granule 20 has a structure in which a plurality of drug substances 19 and a plurality of additive agents 23 are arranged on a surface of one core particle 11.

A construction of the core particle 11 and the drug substance 19 may be the same as that of the granule 10 containing the core particle 11, and a detailed description thereof will be omitted.

The additive agent 23 contained in the granule containing the core particle according to the present embodiment can be selected from any one or more pharmaceutically acceptable additive agents. For example, it may be selected from known excipients, binders, lubricants or disintegrants. In order to arrange the additive agent 23 together with the drug substance 19 on the surface of the core particle 11, the drug substance 19 preferably has a particle size of $D_{50}<50$ μm in an embodiment.

As the excipient, for example, one or more selected from a group consisting of lactose hydrate, mannitol, crystalline cellulose, calcium hydrogen phosphate, calcium hydrogen phosphate anhydride, erythritol, sorbitol and maltitol can be used. The excipient may be contained in an amount of 0% by weight or more and 99% by weight or less when the granule containing the core particle is set as 100% by weight.

As the binder, for example, one or more selected from a group consisting of hydroxypropyl cellulose, hypromellose, methylcellulose, polyvinyl alcohol and polyvinyl alcohol-polyethylene glycol graft copolymer can be used. The binder may be contained in an amount of 0% by weight or more and 50% by weight or less when the granule containing the core particle is set as 100% by weight.

As the disintegrant, for example, one or more selected from a group consisting of crospovidone, low substituted hydroxypropyl cellulose, croscarmellose sodium, sodium carboxymethyl starch, carmellose, carmellose calcium, corn starch and potato starch can be used. The disintegrant may be contained in an amount of 0% by weight or more and 50% by weight or less when the granule containing the core particle is set as 100% by weight.

As the lubricant, for example, one or more selected from a group consisting of light anhydrous silicic acid, hydrous silicon dioxide, magnesium aluminometasilicate, synthetic aluminum silicate, synthetic calcium silicate, magnesium stearate and sodium stearyl fumarate can be used. The lubricant may be contained in an amount of 0% by weight or more and 25% by weight or less when the granule containing the core particle is set as 100% by weight.

[Method for Producing Granules Containing a Core Particle]

According to an embodiment, the granule 20 containing the core particle can be produced by spraying a granulation liquid having a mist diameter ($D_{50}$) not more than a particle size ($D_{50}$) of the core particle 11 to a mixture containing the drug substance 19, the additive agent 23 and the core particle 11 to granulate the mixture. In an embodiment, the mist diameter ($D_{50}$) of the granulation liquid is preferably smaller than the particle size ($D_{50}$) of the core particle 11, and is preferably 90% or less, 80% or less, 70% or less, or 60% or less of the particle size ($D_{50}$) of the core particle 11. For example, $D_{50}$ of the granulation liquid may be 100 μm or less.

In an embodiment, when the partly pregelatinized starch, the thickening polysaccharide, or the carboxyvinyl polymer is used as the core particle 11, water (purified water) can be used as the granulation liquid. Granulation liquid other than water may be used as long as it is liquid having an affinity for the particle used as the core.

In an embodiment, the granulation process can be carried out using a stirring granulation method or a rotating fluidized bed granulation method.

According to the method for producing granules containing a core particle according to the present embodiment, it is possible to provide the granules containing the spherical or substantially spherical core particle in which the drug substance and one or more of additive agents are arranged on the surface more conveniently than the conventional production method.

By using the method for producing granules containing core particle of the present invention described in the Embodiments 1 and 2, it is possible to obtain the granules containing the core particle in a short time as compared with a conventional layering method in which the drug is dissolved or dispersed in the solvent and sprayed on the core particle. While the conventional layering method required a production time from several hours to 1 day on a lab scale, in an embodiment, granules containing the core particle can be obtained in about 30 minutes to 1 hour in the method for producing granules containing the core particle of the present invention. In general, as the amount of the drug substance increases, the time required for layering tends to increase, and the method for producing granules containing the core particle according to the present invention is advantageous for producing granules having a large amount of the drug substance.

In addition, the long production time of the conventional layering method increases the exposure time of the drug substance to air and facilitates the oxidation of the drug substance. However, since the production time is short in the method for producing granules containing the core particle of the present invention, oxidation of the drug substance can be suppressed as compared with the conventional method for producing layering granules. Especially, when the stirring granulation method is used in the method for producing granules containing the core particle of the present invention, the drug substance is hardly exposed to air and oxidation of the drug substance can be suppressed.

[Pharmaceutical Composition]

In an embodiment, provided is a pharmaceutical composition including the granules containing the core particle described in the Embodiment 1 or 2. For example, the granules containing the core particle described in the Embodiment 1 or 2 and any one or more pharmaceutically acceptable additive agents may be mixed to produce a pharmaceutical composition. In the pharmaceutical composition, one or more of additive agents have a structure arranged outside of the granules containing the core particle. As one or more of additive agents arranged outside of the granules containing the core particle, for example, may be selected from known excipients, disintegrants, lubricants, colorants, and flavoring agents. As the excipient, for example, one or more selected from a group consisting of lactose hydrate, mannitol, crystalline cellulose, calcium hydrogen phosphate, calcium hydrogen phosphate anhydride, erythritol, sorbitol and maltitol can be used.

As the disintegrant, for example, one or more selected from a group consisting of crospovidone, low substituted hydroxypropyl cellulose, croscarmellose sodium, sodium carboxymethyl starch, carmellose, carmellose calcium, corn starch and potato starch can be used.

As the lubricant, for example, one or more selected from a group consisting of light anhydrous silicic acid, hydrous silicon dioxide, magnesium aluminometasilicate, synthetic aluminum silicate, synthetic calcium silicate, magnesium stearate and sodium stearyl fumarate can be used.

As the colorant, for example, one or more selected from a group consisting of iron oxides (red ferric oxide, etc.), titanium oxide, tar dyes, and lake dyes can be used.

As the flavoring agent, for example, one or more selected from a group consisting of aspartame, sucralose, saccharin and sodium saccharin hydrate can be used.

[Preparation]

In an embodiment, provided is a preparation including the pharmaceutical composition as described above. The preparation may be selected from known dosage forms such as ordinary tablets, intraorally disintegrating tablets, powders, capsules, and the like.

EXAMPLES

Example 1

Figure 3A:
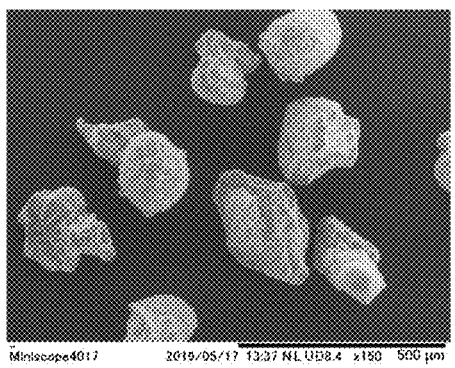
FIG. 3A shows a scanning electron microscope (SEM) image of granules containing the core particle of Example 1 at a magnification of 150 times.
Figure 3B:
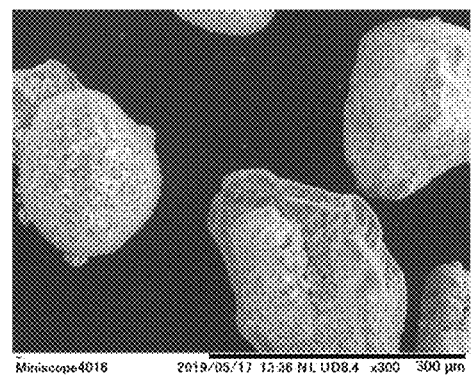
FIG. 3B shows a SEM image of granules containing the core particle of Example 1 at a magnification of 300 times.
Figure 3C:
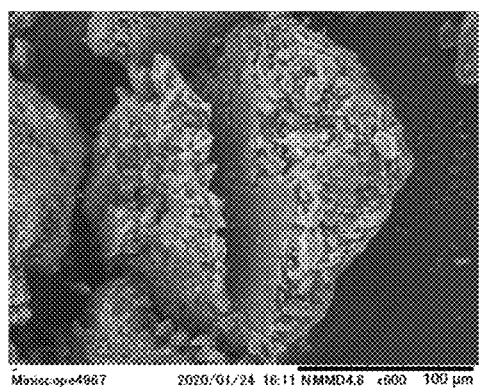
FIG. 3C shows a SEM image of a cross-section of the granule containing the core particle of Example 1 cut with a surgical knife at a magnification of 600 times.

As Example 1, granules containing a core particle containing escitalopram oxalate as the drug substance were produced. The granules containing the core particle were set as 100% by weight, and escitalopram oxalate (particle size ($D_{50}$) was 3.0 μm) 53.2% by weight, partly pregelatinized starch (Colorcon Japan LLC, Starch 1500G, particle size $D_{50}$: 93 μm) 42.6% by weight, and HPC (Nippon Soda Co., Ltd., L) 4.2% by weight were pot into a high-speed stirring granulator (Fukae Kogyo Co., Ltd., FS-GS-5J) and mixed, and purified water was used as the granulation liquid, and the mixture was granulated by spraying so that the solid-liquid ratio became 34%. At this time, the mist diameter of the granulation liquid was less than 33 μm. In the present specification, the mist diameter of the granulation liquid was evaluated as the particle size ($D_{50}$) of a mist sprayed (measurement distance about 30 cm) onto Aerotrack (MicrotracBEL). A SEM image of the obtained granules containing the core particle at a magnification of 150 times is shown in FIG. 3A, a SEM image at a magnification of 300 times is shown in FIG. 3B, and a SEM image of a cross section of the granule containing the core particle cut with a surgical knife at a magnification of 600 times is shown in FIG. 3C. The particle size distribution of the obtained granules containing the core particle is shown in Table 1. In this specification, the particle size distribution of the granules containing the core particle was evaluated by a laser diffraction particle sizing analyzer (Beckman Coulter, Inc., LS 13 320). In this specification, the particle size distributions of the drug substance and the core particle were similarly evaluated.

Example 2

Figure 4A:
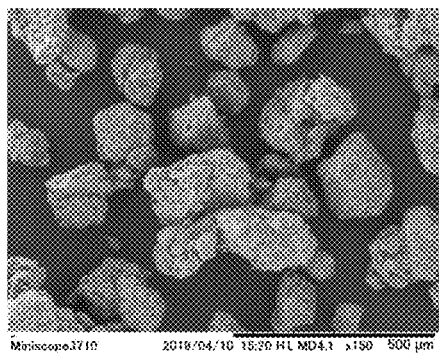
FIG. 4A shows a SEM image of granules containing the core particle of Example 2 at a magnification of 150 times.
Figure 4B:
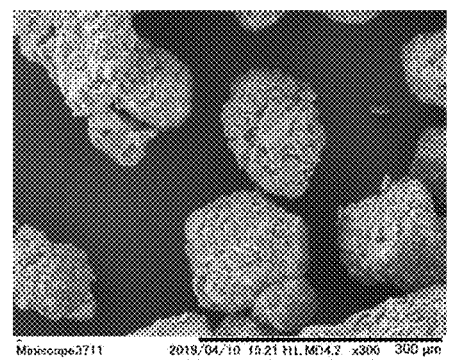
FIG. 4B shows a SEM image of granules containing the core particle of Example 2 at a magnification of 300 times.

As Example 2, granules containing the core particle were produced by changing to escitalopram oxalate having a particle size ($D_{50}$) of 21.0 μm. The granules containing the core particle were set as 100% by weight, escitalopram oxalate 63.9% by weight, a partly pregelatinized starch (Colorcon Japan LLC, Starch 1500G, particle size $D_{50}$: 93 μm) 31.2% by weight, and HPC (Nippon Soda Co., Ltd., L) 5.0% by weight were put into a high-speed stirring granulator (Fukae Kogyo Co., Ltd., FS-GS-5J) and mixed, and purified water was used as the granulation liquid, and the mixture was granulated by spraying so that the solid-liquid ratio became 23%. At this time, the mist diameter of the granulation liquid was less than 33 μm. The SEM image of the obtained granule containing the core particle at a magnification of 150 times is shown in FIG. 4A and the SEM image at a magnification of 300 times is shown in FIG. 4B. Further, the obtained particle size distribution of the granules containing the core particle is shown in Table 1.

Example 3

Figure 5A:
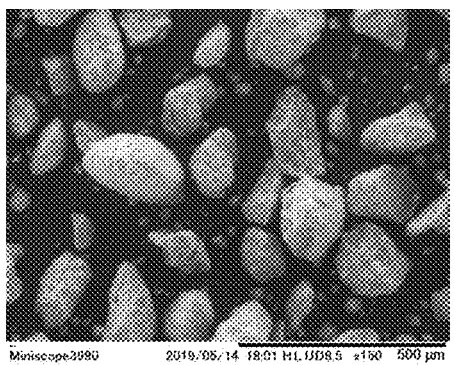
FIG. 5A shows a SEM image of granules containing the core particle of Example 3 at a magnification of 150 times.
Figure 5B:
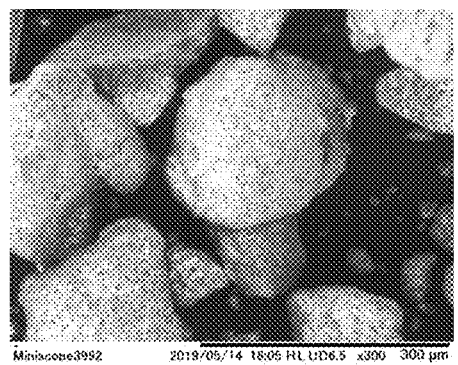
FIG. 5B shows a SEM image of granules containing the core particle of Example 3 at a magnification of 300 times.

As Example 3, granules containing a core particle of escitalopram oxalate were produced without the addition of HPC. The granules containing the core particle were set as 100% by weight, escitalopram oxalate (particle size ($D_{50}$) was 3.0 μm) 60.8% by weight and the partly pregelatinized starch (Colorcon Japan LLC, Starch 1500G, particle size $D_{50}$: 93 μm) 39.2% by weight were put into the high-speed stirring granulator (Fukae Kogyo Co., Ltd., FS-GS-5J) and mixed, and purified water was used as the granulation liquid, and the mixture was granulated by spraying so that the solid-liquid ratio became 51%. At this time, the mist diameter of the granulation liquid was less than 33 μm. The SEM image of the obtained granules containing the core particle is shown in FIG. 5A at a magnification of 150 times and the SEM image at a magnification of 300 times is shown in FIG. 5B. The particle size distribution of the obtained granules containing the core particle is shown in Table 1

Comparative Example 1

Figure 6A:
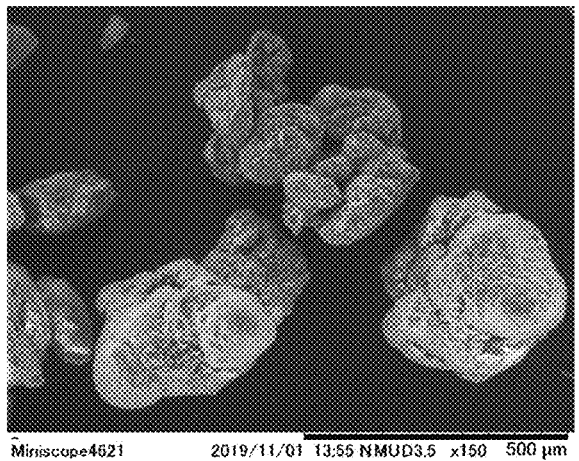
FIG. 6A shows a SEM image of granules containing the core particle of Comparative Example 1 at a magnification of 150 times.

As Comparative example 1, with the same composition as in Example 1, the drug substance and each additive agent were put into the high-speed stirring granulator (Fukae Kogyo Co., Ltd., FS-GS-5J) and mixed, and purified water was used as the granulation liquid and the mixture was granulated by spraying so that the solid-liquid ratio became 35%. At this time, the mist diameter of the granulation liquid was 104 μm. The SEM image of the obtained granules at magnification of 150 times is shown in FIG. 6A. The particle size distribution of the obtained granules is shown in Table 1.

Comparative Example 2

Figure 6B:
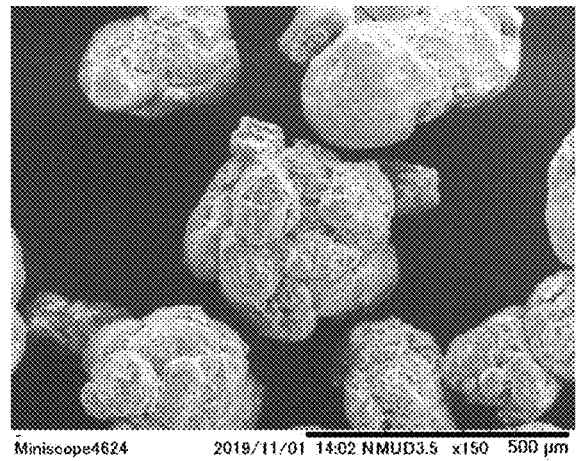
FIG. 6B shows a SEM image of granules containing the core particle of Comparative Example 2 at a magnification of 150 times.

As Comparative example 2, with the same composition as in Example 1, the drug substance and each additive agent were put into the high-speed stirring granulator (Fukae Kogyo Co., Ltd., FS-GS-5J) and mixed, and purified water was used as the granulation liquid and the mixture was granulated by spraying so that the solid-liquid ratio became 35%. At this time, the mist diameter of the granulation liquid was 153 μm. The SEM image of the obtained granules at a magnification of 150 times is shown in FIG. 6B. The particle size distribution of the obtained granules is shown in Table 1

TABLE 1

| Particle size distribution | Example 1 | Example 2 | Example 3 | Comparative example 1 | Comparative example 2 |
|---|---|---|---|---|---|
| $D_{10}$ | 68.2 μm | 43.5 μm | 16.1 μm | 125 μm | 185 μm |
| $D_{50}$ | 154.9 μm | 137.3 μm | 148.8 μm | 243 μm | 380 μm |
| $D_{90}$ | 218.1 μm | 227.4 μm | 267.1 μm | 455 μm | 541 μm |

From the results of Table 1 and FIGS. 3A to 5B, it was shown that granules containing the substantially spherical core particle containing escitalopram oxalate can be produced by the production methods of Examples 1 to 3 in which the mist diameter of the granulation liquid is set to be the particle size or less of the core particle and the partly pregelatinized starch is contained as the core particle. Further, it became clear that the core particle has a structure in which the escitalopram oxalate is arranged on the surface of the core particle of the partly pregelatinized starch from the observation result of the cross-section of the granule containing the core particle cut with a surgical knife shown in FIG. 3C. On the other hand, from the results of Table 1 and FIG. 6A and FIG. 6B, in comparative Examples 1 and 2 in which the mist diameter of the granulation liquid exceeds the particle size of the core particle, it became granules containing a plurality of partly pregelatinized starch particles and escitalopram oxalates, and the other additive agents as in the usual granule, it was not possible to produce the granules containing the substantially spherical core particle containing escitalopram oxalate.

Example 4

As Example 4, granules containing a core particle containing cinacalcet hydrochloride as the drug substance were produced. The granules containing the core particle were set as 100% by weight, cinacalcet hydrochloride (particle size ($D_{50}$) was 10 μm) 50% by weight and the partly pregelatinized starch (Colorcon Japan LLC, Starch 1500G, particle size $D_{50}$: 93 μm) 50% by weight were put into the high-speed stirring granulator (Fukae Kogyo Co., Ltd., FS-GS-5J) and mixed, and purified water was used as the granulation liquid and the mixture was granulated by spraying so that the solid-liquid ratio became 56%. At this time, the mist diameter of the granulation liquid was 44 μm. An optical microscope image of the obtained granules containing the core particle is shown in FIG. 7B. The particle size distribution of the obtained granules containing the core particle is shown in Table 2

Example 5

As Example 5, crystalline cellulose, crospovidone and hydroxypropyl cellulose (hereinafter, also referred to as HPC.) were further added as the additive agents to produce granules containing the core particle containing cinacalcet hydrochloride as the drug substance. The granules containing the core particle were set as 100% by weight, cinacalcet hydrochloride (particle size ($D_{50}$) was 10 μm) 15.5% by weight, the partly pregelatinized starch (Colorcon Japan LLC, Starch 1500G, particle size $D_{50}$: 93 μm) 25.4% by weight, crystalline cellulose (Asahi Kasei Corp., PH-102) 56.2% by weight, crospovidone (BASF Japan, Kollidon (registered trademark) CL-F) 2.2% by weight, and HPC (Nippon Soda Co., Ltd., L) 0.6% by weight were put into a high-speed mixer (Earthtechnica Co., Ltd., FS25) and mixed, and purified water was used as the granulation liquid, and the mixture was granulated by spraying so that the solid-liquid ratio became 71%. At this time, the mist diameter of the granulation liquid was 56 μm. An optical microscope image of the obtained granules containing the core particle is shown in FIG. 7C. The particle size distribution of the obtained granules containing the core particle is shown in Table 2

Example 6

As Example 6, the amounts of added cinacalcet hydrochloride, partly pregelatinized starch and crystalline cellulose were changed from Example 5 to produce granules containing core particle containing cinacalcet hydrochloride as the drug substance. The granules containing the core particle were set as 100% by weight, and cinacalcet hydrochloride (particle size ($D_{50}$) was 10 μm) 46.5% by weight, the partly pregelatinized starch (Colorcon Japan LLC, Starch 1500G, particle size $D_{50}$: 93 μm) 45.1% by weight, crystalline cellulose (Asahi Kasei Corp., PH-102) 5.6% by weight, crospovidone (BASF Japan, Kollidon (registered trademark) CL-F) 2.2% by weight, and HPC (Nippon Soda Co., Ltd., L) 0.6% by weight were put into the high-speed mixer (Earthtechnica Co., Ltd., FS25) and mixed, and purified water was used as the granulation liquid, and the mixture was granulated by spraying so that the solid-liquid ratio became 71%. At this time, the mist diameter of the granulation liquid was 56 μm. An optical microscope image of the obtained granules containing the core particle is shown in FIG. 7D. The particle size distribution of the obtained granules containing the core particle is shown in Table 2

Comparative Example 3

As Comparative example 3, the drug substance and each additive agent were put into the high-speed stirring granulator (Fukae Kogyo Co., Ltd., FS-GS-5J) and mixed with the same composition as in Example 5, and purified water was used as the granulation liquid, and the mixture was granulated by dropping by a funnel so that the solid-liquid ratio became 47%. At this time, the diameter of a droplet of the granulated liquid was about 2 mm to 5 mm. Since the diameter of the droplet cannot be measured by Aerotrack, it was used as an eye measurement value. In the production method of Comparative example 3, it was not possible to produce granules containing a core particle, and became a mixture of coarse particles and fine powder.

TABLE 2

| Particle size distribution | Example 4 | Example 5 | Example 6 | Comparative example 3 |
|---|---|---|---|---|
| $D_{10}$ | 65 μm | 64 μm | 23 μm | Unmeasurable |
| $D_{50}$ | 160 μm | 162 μm | 150 μm | Unmeasurable |
| $D_{90}$ | 385 μm | 378 μm | 321.5 μm | Unmeasurable |

Figure 7A:
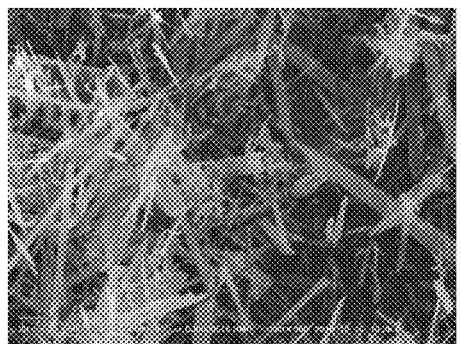
FIG. 7A shows a SEM image of cinacalcet hydrochloride.
Figure 7B:
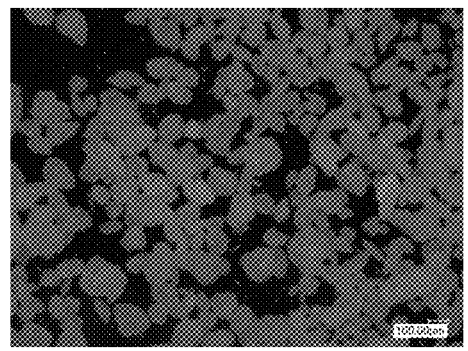
FIG. 7B shows an optical microscope image of granules containing the core particle of Example 4.
Figure 7C:
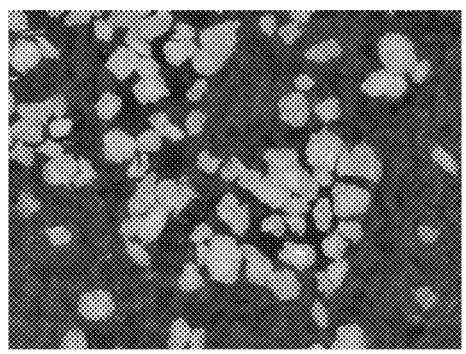
FIG. 7C shows an optical microscope image of granules containing the core particle of Example 5.
Figure 7D:
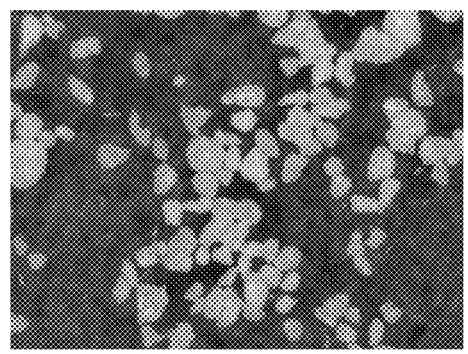
FIG. 7D shows an optical microscope image of granules containing the core particle of Example 6.
Figure 8A:
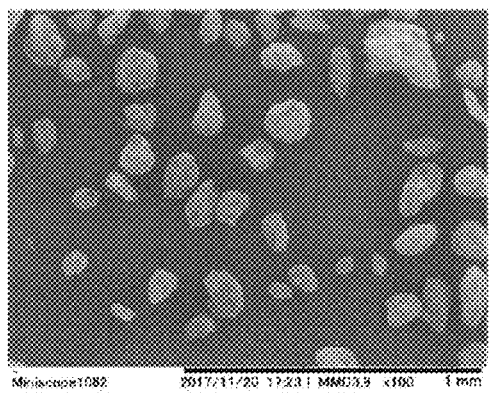
FIG. 8A shows a SEM image of granules containing the core particle of Example 4 at a magnification of 100 times.
Figure 8B:
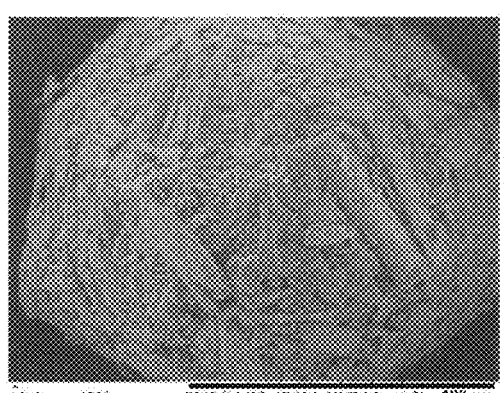
FIG. 8B shows a SEM image of granules containing the core particle of Example 4 at a magnification of 1000 times.
Figure 8C:
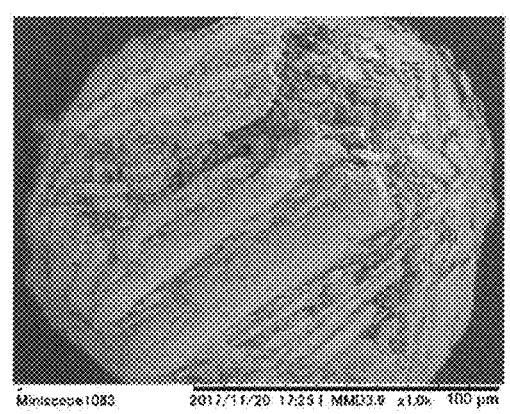
FIG. 8C shows a SEM image of granules containing the core particle of Example 4 at a magnification of 1000 times.

FIG. 7A shows a SEM image of cinacalcet hydrochloride. FIGS. 8A to 8C show SEM images of the granules containing the core particle of Example 4, FIG. 8A shows a SEM image at a magnification of 100 times, FIG. 8B shows a SEM image at a magnification of 1000 times, and FIG. 8C shows a SEM image at a magnification of 1000 times. From the results of Table 2, FIGS. 7B to 7D, and FIGS. 8A to 8C, it was shown that granules containing the substantially spherical core particle containing cinacalcet hydrochloride, which is a plate crystal, can be produced by the production methods of Examples 4 to 6 in which the mist diameter of the granulation liquid was set to be the particle size or less of the core particle. Even when crystalline cellulose, crospovidone and HPC are contained as the additive agents, granules containing substantially spherical core particle containing cinacalcet hydrochloride, which is the plate crystal, can be produced by the production methods of Examples 4 to 6 in which the mist diameter of the granulation liquid is set to be the particle size or less of the core particle.

Example 7

As Example 7, granules containing a core particle containing memantine hydrochloride as the drug substance were produced. The granules containing the core particle were set as 100% by weight, memantine hydrochloride (particle size ($D_{50}$) was 8.4 μm) 39.2% by weight, the partly pregelatinized starch (Colorcon Japan LLC, Starch 1500G, particle size $D_{50}$: 93 μm) 39.2% by weight, D-mannitol (Mitsubishi Shoji Foodtech Co., Ltd., Mannitol P) 7.8% by weight, crystalline cellulose (Asahi Kasei Corp., PH-102) 10.2% by weight, carmellose calcium (Gotoku Chemical Co., LTD., E.C.G (registered trademark)-505) 2.7% by weight, and HPC (Nippon Soda Co., Ltd., L) 0.8% by weight were put into the high-speed stirring granulator (Fukae Kogyo Co., Ltd, FS-GS-5J) and mixed, and purified water was used as the granulation liquid, and the mixture was granulated by spraying so that the solid-liquid ratio became 43%. At this time, the mist diameter of the granulation liquid was less than 16 μm. An optical microscope image of the obtained granules containing the core particle is shown in FIG. 9B. The particle size distribution of the obtained granules containing the core particle is shown in Table 3

Example 8

As Example 8, by changing the partly pregelatinized starch to 7.8% by weight and the D-mannitol to 39.2% by weight, granules containing a core particle containing memantine hydrochloride as the drug substance were produced by the same production method as in Example 7. Purified water was used as the granulation liquid and the mixture was granulated by spraying so that the solid-liquid ratio became 46%. At this time, the mist diameter of the granulation liquid was less than 14 μm. An optical microscope image of the obtained granules containing the core particle is shown in FIG. 9C. The particle size distribution of the obtained granules containing the core particle is shown in Table 3.

Comparative Example 4

As Comparative example 4, the mixture was granulated without adding the partly pregelatinized starch. The granules were set as 100% by weight, memantine hydrochloride (particle size ($D_{50}$) was 8.4 μm) 35.1% by weight, D-mannitol (Mitsubishi Shoji Foodtech Co., Ltd., Mannitol P) 52.3% by weight, crystalline cellulose (Asahi Kasei Corp., PH-102) 9.5% by weight, carmellose calcium (Gotoku Chemical Co. LTD., E.C.G (registered trademark)-505) 2.5% by weight and HPC (Nippon Soda Co., Ltd., L) 0.7% by weight were put into the high-speed mixer (Earthtechnica Co., Ltd., FS25) and mixed, and purified water was used as the granulation liquid, and the mixture was granulated by spraying so that the solid-liquid ration became 33% by weight. At this time, the mist diameter of the granulation liquid was 18 μm. An optical microscope image of the obtained granules is shown in FIG. 9D. The particle size distribution of the obtained granules is shown in Table 3.

TABLE 3

| Particle size distribution | Example 7 | Example 8 | Comparative example 4 |
|---|---|---|---|
| $D_{10}$ | 21 μm | 65 μm | 13 μm |
| $D_{50}$ | 99 μm | 160 μm | 83 μm |
| $D_{90}$ | 254 μm | 385 μm | 220 μm |

Figure 9A:
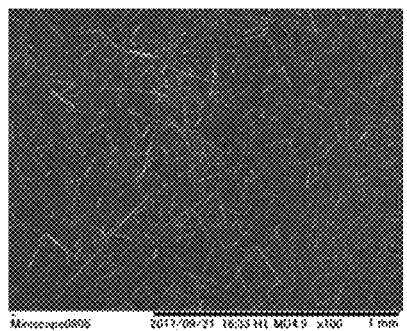
FIG. 9A shows a SEM image of memantine hydrochloride.
Figure 9B:
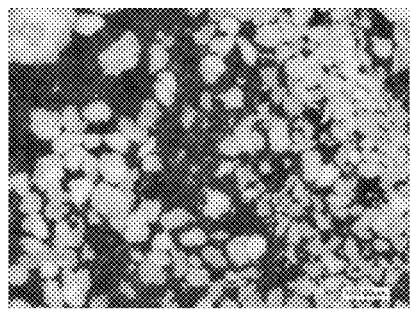
FIG. 9B shows an optical microscope image of granules containing the core particle of Example 7.
Figure 9C:
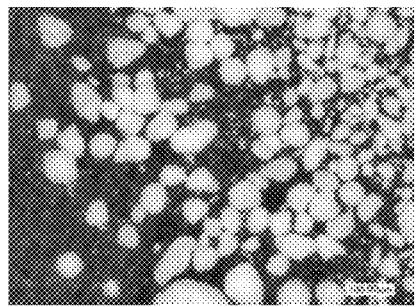
FIG. 9C shows an optical microscope image of granules containing the core particle of Example 8.
Figure 9D:
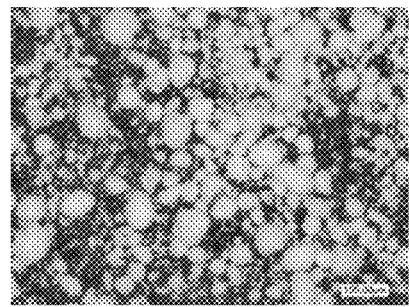
FIG. 9D shows an optical microscope image of granules containing the core particle of Comparative Example 4.

FIG. 9A shows a SEM image of memantine hydrochloride. From the results of Table 3 and FIGS. 9B to 9C, it was shown that granules containing the substantially spherical core particle containing memantine hydrochloride, which is a needle crystal, can be produced by the production method of Examples 7 to 8 in which the mist diameter of the granulation liquid is set to be the particle size or less of the core particle and the partly pregelatinized starch is contained as the core particle. On the other hand, in the production method of Comparative example 4 not containing the partly pregelatinized starch even when the mist diameter of the granulation liquid was set to be the particle size or less of the core particle, many ungranulated particles were observed as is also apparent from FIG. 9D.

Example 9

As Example 9, granules containing a core particle containing ramelteon as the drug substance were produced. The granules containing the core particle were set as 100% by weight, ramelteon (particle size ($D_{50}$) was 8.5 μm) 30% by weight and the partly pregelatinized starch (Colorcon Japan LLC, Starch 1500G, particle size $D_{50}$: 93 μm) 70% by weight were put into the high-speed stirring granulator (Fukae Kogyo Co., Ltd., FS-GS-5J) and mixed, and purified water was used as the granulation liquid, and the mixture was granulated by spraying so that the solid-liquid ratio became 58%. At this time, the mist diameter of the granulation liquid was less than 16 μm. An optical microscope image of the obtained granules containing the core particle is shown in FIG. 10B. The particle size distribution of the obtained granules containing the core particle is shown in Table 4.

TABLE 4

| Particle size distribution | Example 9 |
|---|---|
| $D_{10}$ | 59 μm |
| $D_{50}$ | 132 μm |
| $D_{90}$ | 207 μm |

Figure 10A:
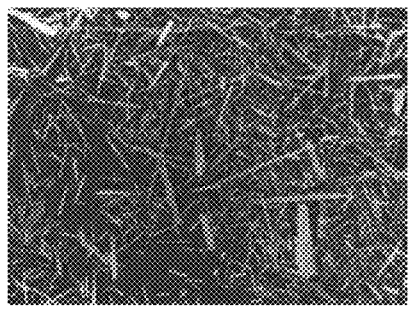
FIG. 10A shows a SEM image of ramelteon.
Figure 10B:
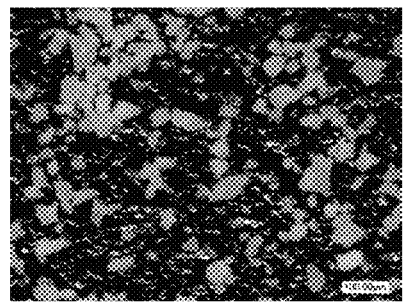
FIG. 10B shows an optical microscope image of granules containing the core particle of Example 9.

FIG. 10A shows a SEM image of ramelteon. From the results of Table 4 and FIG. 10B, it was shown that it is possible to produce granules containing the substantially spherical core particle containing ramelteon which is a needle crystal or a plate crystal by the production method of Example 9 in which the mist diameter of the granulation liquid was set to be the particle size or less of the core particle and the partly pregelatinized starch was contained as the core particle.

Example 10

Figure 11A:
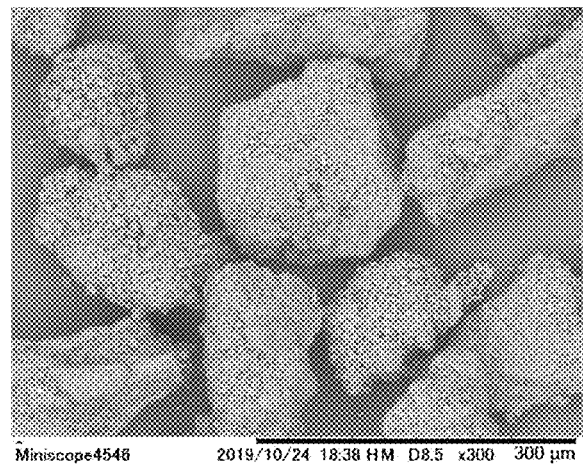
FIG. 11A shows a SEM image of granules containing the core particle of Example 10 at a magnification of 300 times.
Figure 11B:
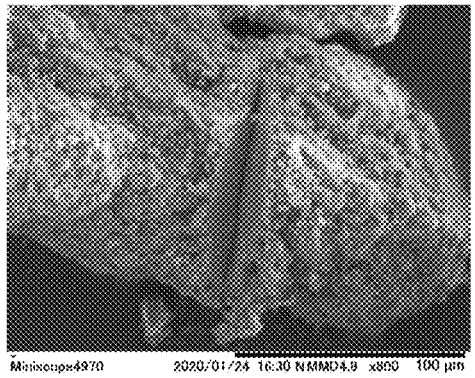
FIG. 11B shows a SEM image of a cross-section of the granule containing the core particle of Example 10 cut with a surgical knife, at a magnification of 800 times.
Figure 11C:
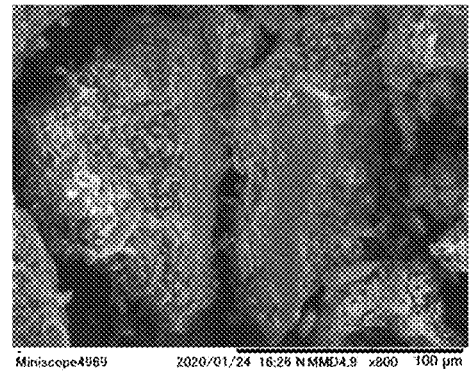
FIG. 11C shows a SEM image of a cross-section of the granule containing the core particle of Example 10 with a surgical knife, at a magnification of 800 times.

In the above-described embodiment, an example in which the partly pregelatinized starch was used as the core particle is shown. As Example 10, granules containing a core particle were produced using xanthan gum instead of the partly pregelatinized starch. The granules containing the core particle containing escitalopram oxalate as the drug substance were produced by the same production method as in Example 1, except that xanthan gum (CP Kelco Co., Ltd., XANTURAL 180, particle size $D_{50}$: 139 μm) 42.6% by weight was used instead of the partly pregelatinized starch. At this time, the mist diameter of the granulation liquid was less than 33 μm. A SEM image of the obtained granules containing the core particle is shown in FIG. 11A at a magnification of 300 times, and SEM images of a cross section obtained by cutting the granule containing the core particle with a surgical knife are shown in FIGS. 11B and 11C at a magnification of 800 times. The particle size distribution of the obtained granules containing the core particle is shown in Table 5. Table 5 re-lists the particle size distribution of Example 1.

TABLE 5

| Particle size distribution | Example 1 | Example 10 |
|---|---|---|
| $D_{10}$ | 68.2 μm | 104 μm |
| $D_{50}$ | 154.9 μm | 163 μm |
| $D_{90}$ | 218.1 μm | 239 μm |

From the results of Table 5 and FIG. 11A, even when changing the core particle to xanthan gum, it was shown that it is possible to produce the granules containing the substantially spherical core particle containing escitalopram oxalate by the production method of Example 10 in which the mist diameter of the granulation liquid was set to be the particle size or less of the core particle. Further, from the observation results of the cross-section of the granule containing the core particle cut with a surgical knife shown in FIGS. 11B and 11C, it became clear that the core particle has a structure in which the escitalopram oxalate is arranged on the surface of the core particle of xanthan gum.

An embodiment of the present invention can provide a method for producing granules comprising a core particle which can be produced more conveniently than a conventional manufacturing method using a general granulation method for obtaining granules. An embodiment of the present invention can provide granules containing the core particle produced by the production method thereof. An embodiment of the present invention can provide a pharmaceutical composition and a preparation comprising the granules containing the core particle.

What is claimed is:

1. A method for producing granules comprising:
spraying granulation liquid to a mixture containing a drug substance particle and a core particle to granulate the mixture and cause the drug substance particle to be arranged on a surface of the core particle to obtain the granules, wherein the mixture further contains particles of one or more pharmaceutically acceptable additive agents or the mixture is free from having the particles of one or more pharmaceutically acceptable additive agents,
wherein the core particle is one selected from a group consisting of a partly pregelatinized starch, a thickening polysaccharide and a carboxy vinyl polymer,
the drug substance is a needle crystal or a plate crystal, and
the granulation liquid has a mist diameter ($D_{50}$) of 90% or less relative to a particle size ($D_{50}$) of the core particle.

2. The method for producing granules according to claim 1, wherein the mist diameter ($D_{50}$) of the granulation liquid is 60% or less relative to the particle size ($D_{50}$) of the core particle.

3. The method for producing granules according to claim 1, wherein the granulation liquid is water.

4. The method for producing granules according to claim 1, wherein the particle size ($D_{50}$) of the core particle is larger than a particle size ($D_{50}$) of the drug substance.

5. The method for producing granules according to claim 1, wherein the mixture is granulated by a stirring granulation method or a rotating fluidized bed granulation method.

6. A granule consisting of:
a core particle; and
a drug substance particle with particles of one or more pharmaceutically acceptable additive agents or without the particles of one or more pharmaceutically acceptable additive agents arranged on a surface of the core particle,
wherein
the core particle is one selected from a group consisting of a partly pregelatinized starch, a thickening polysaccharide and a carboxy vinyl polymer,
the drug substance is a needle crystal or a plate crystal,
the core particle has a particle size ($D_{50}$) of 60 μm or more and 250 μm or less, and
the drug substance is arranged on the surface of the core particle by spraying a mixture containing the core particle and the drug substance particle with a granulation liquid having a mist diameter ($D_{50}$) of 90% or less relative to the particle size ($D_{50}$) of the core particle.

7. The granule according to claim 6, wherein the particle size ($D_{50}$) of the core particle is larger than a particle size ($D_{50}$) of the drug substance.

8. A granule consisting of:
a core particle; and
a drug substance particle with particles of one or more pharmaceutically acceptable additive agents or without the particles of one or more pharmaceutically acceptable additive agents arranged on a surface of the core particle,
wherein the core particle is one selected from a group consisting of a partly pregelatinized starch, a thickening polysaccharide and a carboxy vinyl polymer,
the core particle has a particle size ($D_{50}$) of 60 μm or more and 250 μm or less,
the drug substance is a needle crystal or a plate crystal, and
the core particle is granulated by spraying granulation liquid having a mist diameter ($D_{50}$) not more than the particle size ($D_{50}$) of the core particle, to a mixture containing the drug substance particle and the core particle.

9. The granule according to claim 8, wherein the granulation liquid is water.

10. The granule according to claim 8, wherein the particle size ($D_{50}$) of the core particle is larger than the particle size ($D_{50}$) of the drug substance.

11. A pharmaceutical composition comprising:
the granule according to claim 6; and
the one or more pharmaceutically acceptable additive agents on the surface of the core particle.

12. A preparation comprising: the pharmaceutical composition according to claim 11.

13. The method for producing granules according to claim 1, wherein the mixture further contains the particles of the one or more pharmaceutically acceptable additive agents.

14. The method for producing granules according to claim 1, wherein the mixture is free from containing particles of one or more pharmaceutically acceptable additive agents.

15. The granule according to claim 8, wherein the mist diameter ($D_{50}$) of the granulation liquid is 90% or less relative to the particle size ($D_{50}$) of the core particle.

* * * * *